(12) United States Patent
Chouan et al.

(10) Patent No.: US 11,731,158 B2
(45) Date of Patent: Aug. 22, 2023

(54) COATING PRODUCT APPLICATOR, APPLICATION INSTALLATION COMPRISING SUCH AN APPLICATOR AND APPLICATION METHOD USING SUCH AN APPLICATOR

(71) Applicant: Exel Industries, Epernay (FR)

(72) Inventors: Nicolas Chouan, Paris (FR); Cyrille Medard, Paris (FR)

(73) Assignee: Exel Industries, Epernay (FR)

( * ) Notice: Subject to any disclaimer, the term of this patent is extended or adjusted under 35 U.S.C. 154(b) by 136 days.

(21) Appl. No.: 16/851,927

(22) Filed: Apr. 17, 2020

(65) Prior Publication Data
US 2020/0331023 A1 Oct. 22, 2020

(30) Foreign Application Priority Data

Apr. 19, 2019 (FR) ...................... 1904218

(51) Int. Cl.
*B05C 5/02* (2006.01)
*B05D 1/02* (2006.01)
*B41J 3/407* (2006.01)
*B41J 2/14* (2006.01)
*B05B 13/04* (2006.01)
*B25J 15/00* (2006.01)
(Continued)

(52) U.S. Cl.
CPC ........ *B05C 5/0291* (2013.01); *B05B 13/0431* (2013.01); *B05C 5/027* (2013.01); *B05D 1/02* (2013.01); *B25J 11/0075* (2013.01); *B25J 15/0019* (2013.01); *B41J 2/14* (2013.01); *B41J 3/4073* (2013.01); *B05B 7/0408* (2013.01); *B05B 12/04* (2013.01); *B05B 12/18* (2018.02); *B05B 13/0452* (2013.01); *B05B 15/65* (2018.02); *B62D 65/00* (2013.01)

(58) Field of Classification Search
CPC ....... B05C 5/0291; B05C 5/027; B62D 65/00; B05B 1/083; B05B 7/0408; B05B 12/04; B05B 12/18; B05B 13/0452; B05B 15/65; B05B 13/0431; B41J 3/4073; B41J 2/14; B41J 3/407; B41J 2002/14475; B25J 11/0075; B25J 15/0019
USPC ....................................... 118/313
See application file for complete search history.

(56) References Cited

U.S. PATENT DOCUMENTS 9,011,967 B2    4/2015   Truong et al.
9,630,396 B2    4/2017   Orr
(Continued)

FOREIGN PATENT DOCUMENTS

CN    101939171 A    1/2011
CN    102224012 A    10/2011
(Continued)

OTHER PUBLICATIONS

English Translation of Makita et al, JP2003-251813, published Sep. 9, 2003 (Year: 2003).*

*Primary Examiner* — Laura Edwards
(74) *Attorney, Agent, or Firm* — Thompson Coburn LLP; Steven M. Ritchey (57) ABSTRACT

An applicator for a coating product comprising printing nozzles, each including an outlet channel emerging in the downstream direction by a coating product discharge orifice. The printing nozzles are distributed on at least two faces of a body of the applicator and the discharge orifices of these nozzles extend along at least two nonparallel planes.

32 Claims, 6 Drawing Sheets

(51) Int. Cl.
  *B25J 11/00* (2006.01)
  *B62D 65/00* (2006.01)
  *B05B 7/04* (2006.01)
  *B05B 12/04* (2006.01)
  *B05B 15/65* (2018.01)
  *B05B 12/18* (2018.01)

(56) References Cited

U.S. PATENT DOCUMENTS

| | | | |
|---|---|---|---|
| 9,796,951 | B2 | 10/2017 | Detering et al. |
| 10,150,304 | B2 | 12/2018 | Herre et al. |
| 10,688,516 | B2 | 6/2020 | Medard et al. |
| 11,241,889 | B2 | 2/2022 | Herre et al. |
| 2003/0017276 | A1* | 1/2003 | Yamada ............... B05B 12/16 427/372.2 |
| 2010/0119722 | A1* | 5/2010 | Tarozzi ............... B28B 11/001 901/43 |
| 2011/0012961 | A1* | 1/2011 | Hu ........................ B41J 2/155 347/47 |
| 2011/0262622 | A1* | 10/2011 | Herre .................... B05C 5/027 118/712 |

FOREIGN PATENT DOCUMENTS

| | | |
|---|---|---|
| CN | 102449806 A | 5/2012 |
| CN | 108212574 A | 6/2018 |
| DE | 102019102088 A1 | 8/2019 |
| EP | 1884365 A1 | 2/2008 |
| EP | 2139656 A2 | 1/2010 |
| EP | 3292914 A1 | 3/2018 |
| JP | 2002079174 A | 3/2002 |
| JP | 2003251813 * | 9/2003 |
| JP | 2007230849 A | 9/2007 |
| WO | 08125967 A2 | 10/2008 |
| WO | 2010046064 A1 | 4/2010 |
| WO | 2015036235 A1 | 3/2015 |

* cited by examiner

COATING PRODUCT APPLICATOR, APPLICATION INSTALLATION COMPRISING SUCH AN APPLICATOR AND APPLICATION METHOD USING SUCH AN APPLICATOR

CROSS-REFERENCE TO RELATED APPLICATIONS

This application claims priority to French patent application 1904218, filed Apr. 19, 2019, which is incorporated herein by reference in its entirety.

FIELD OF THE INVENTION

The present invention relates to a coating product applicator that comprises one of the printing nozzles each including an outlet channel emerging in the downstream direction by a coating product discharge orifice.

BACKGROUND OF THE INVENTION

The demand for customization of the decoration affixed on objects is tending to increase substantially. For example, the coating of dual-tone motor vehicle bodies is becoming increasingly frequent. Thus, many motor vehicles have black door uprights, while the rest of the body is painted another color. For high-end vehicles, black styling is applied on the door uprights, on surfaces delimited by cover plates. Another technique consists of placing black stickers on the uprights by hand. These two methods of producing black uprights are time-consuming, require qualified labor and are expensive. Similar problems arise in producing a decorative pattern on a body, for example a black strip on the roof or the hood of the body, or an entire roof in a different color from the rest of the body.

Applying paint using printing heads comprising printing nozzles makes it possible to achieve a certain precision in the application of paint. As considered in EP-A-1,884,365, two printing heads can be mounted side by side and articulated relative to one another to follow the geometry of a surface to be coated.

However, despite the use of a dropwise system, a precise multiaxial robot moving the printing head and a rapid automaton, with a scanning time in the order of a millisecond (ms), a strip of paint applied on a body has sharp edges along the movement axis of the applicator, but not at its ends. The starting line of the application, which corresponds to the activation zone of the printing nozzles, and the arrival line of the strip of paint, which corresponds to the stopping or the deactivation of these nozzles, are jagged, that is to say, they have irregularities. It is possible to consider using the nozzles of another applicator to create a transverse line in a first application pass, with a slight overlap, in order to smooth the jagged phenomenon as much as possible. However, in this case, a problem of accessibility by the robot to the application zone arises. For example, if a strip is considered made on the roof of the body of a motor vehicle, a robot must be able to reach the front windshield zone and the rear windshield zone to apply a transverse line, along the width of the vehicle. In practice, this is very difficult to carry out.

If the coating station in which the application of a strip is implemented is in "tracking" mode, that is to say, the conveyor moving the motor vehicle bodies does not stop during the application, the robot can access the front part of the vehicle, then after a length of time, the rear part. This operating mode is not truly compatible with the precise application of paint, inasmuch as one wishes to make precisely defined strips along the conveyor axis. Additionally, the position of the vehicle over time is not defined precisely enough to create completely sharp starting and finish lines. In this case, the speed of the conveyor is not known very precisely, in particular due to undulations caused by the regulation and the movement of the drive motor of the conveyor.

If the station is in "stop and go" mode, that is to say, the body is immobilized in a given position during the application of paint, the multiaxial robot supporting the applicator must be equipped with a seventh robotic axis, in practice formed by a movement rail of the robot along the movement axis of the conveyor. This solution is also not precise enough in light of the expected result. It is also costly in terms of cycle time, since it requires positioning the robot on the front windshield zone, before painting, then repositioning the robot on the rear windshield zone, also before painting.

Such an issue also arises for the application of two-tone paint on elements other than whole motor vehicle bodies, in particular on parts made from synthetic material, such as bumpers, or in the aeronautic field, for coating aircraft cabins.

BRIEF SUMMARY OF THE INVENTION

The present invention aims to address these issues by proposing a new coating product applicator that both allows a precise application of coating product, including at the starting and finish lines of the strip or another pattern, and has a reduced cycle time relative to the known solutions.

To that end, the invention relates to a coating product applicator comprising printing nozzles each including an outlet channel emerging in the downstream direction by a coating product discharge orifice. According to the invention, the printing nozzles are distributed on at least two faces of a body of the applicator and the discharge orifices of these nozzles extend along at least two nonparallel planes.

Owing to the invention, the printing nozzles positioned on a face of the body of the applicator can be used for certain coating product application phases, for example parallel to the largest dimension of a strip of paint to be applied on the roof of the body of a motor vehicle, while the printing nozzles distributed on a second face of the same applicator of discharge nozzles can be used to produce the starting and finish lines of such a strip, with great precision.

According to advantageous but optional aspects of the invention, such an applicator may incorporate one or more of the following features, considered in any technically allowable combination:

The two planes form, between them and on the side of the body of the applicator, an angle of between 30° and 150°, preferably between 60° and 120°, preferably equal to 60°, 90° or 120°.
  The applicator comprises several first printing nozzles, the discharge orifices of which are distributed on a first face of the body, and at least one second printing nozzle, the outlet orifice of which is on a second face of the body, and in that the number of first nozzles is different from the number of second nozzle(s).
  The printing nozzles are [sic] distributed on the at least two faces of the body are of the same type and have discharge orifices with identical dimensions.
  The printing nozzles distributed on the at least two faces of the body are of the same type and have, on each face, discharge orifices with identical dimensions and, between two faces, discharge orifices with different dimensions.

The at least two faces of the body on which the printing nozzles are distributed are adjacent.

The printing nozzles distributed on two separate faces of the body are activated independently of one another when the applicator is operating.

The applicator comprises a mixer integrated into the body of the applicator, upstream from the printing nozzles.

According to another aspect, the invention relates to an installation for applying a coating product on objects to be coated, which comprises at least one applicator as mentioned above, preferably mounted on the arm of a multiaxial robot provided to move it relative to the objects to be coated.

According to another aspect, the invention relates to a method for applying coating product on an object to be coated, using an applicator as mentioned above, this method comprising at least the following steps consisting of:

a) producing a pattern with the coating product, by moving the applicator along a first movement axis, while first printing nozzles distributed on a first face of the body of the applicator are active; and b) making at least one transverse border of the pattern, by moving the applicator along a second axis perpendicular to the first axis, while second printing nozzles distributed on a second face of the body are active.

This method makes it possible to apply a coating product with great precision and quickly.

Preferably, during steps a) and/or b), the application distance between the discharge orifices of the active printing nozzles and the surface of an object in the process of being coated is between 5 and 50 mm.

BRIEF DESCRIPTION OF THE DRAWINGS

The invention and other advantages thereof will be better understood in light of the following description of two embodiments of an applicator, an installation and a method according to the invention, provided solely as an example and done in reference to the drawings.

DETAILED DESCRIPTION OF THE INVENTION

Figure 1:
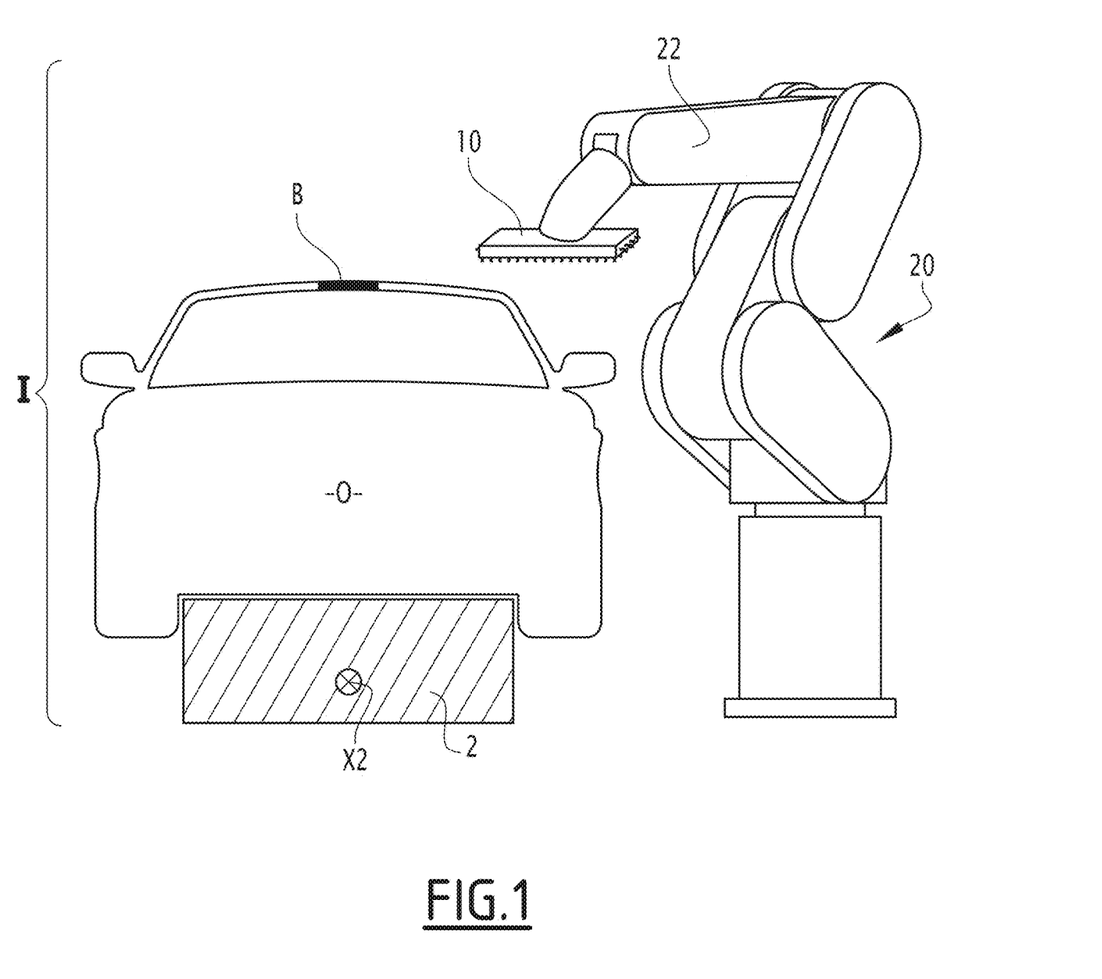
FIG. 1 is a schematic block diagram, in front view, of an installation according to the invention incorporating an applicator according to the invention.
Figure 4:
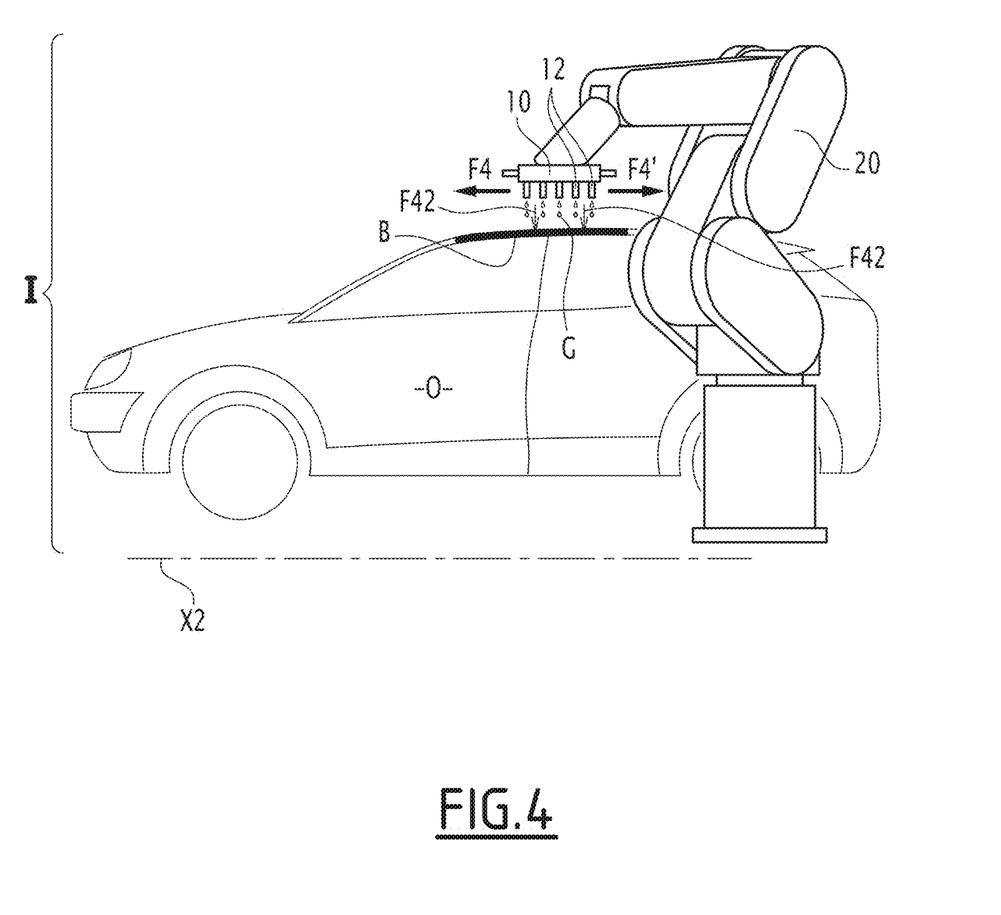
FIG. 4 is a side view of the installation of FIG. 1, during a first step of a method for applying coating product according to the invention.
Figure 5:
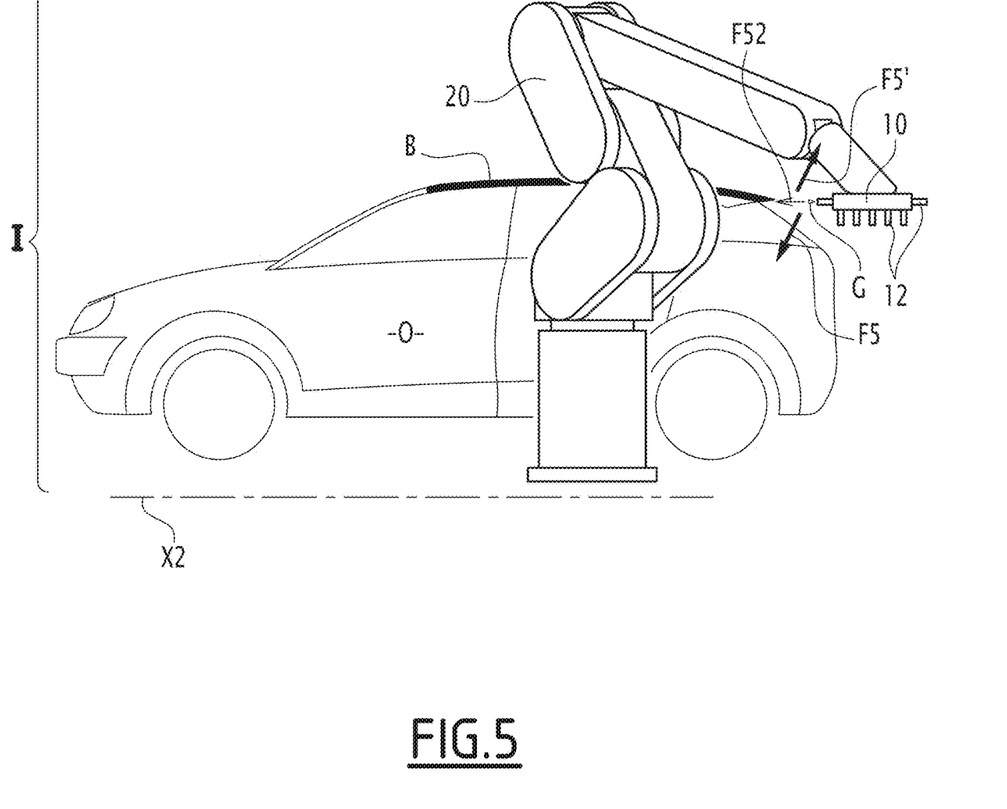
FIG. 5 is a view similar to FIG. 4, during a second step of the same method.

The installation I shown in FIGS. 1, 4 and 5 is provided for the application of paint on objects O which, in the example of the figures, are motor vehicle bodies. More specifically, in this example, the installation I aims to allow the creation of a strip B of contrasting color, for example black, on the roof of such a body.

In a variant, the objects to be coated can be parts of motor vehicle bodies, for example bumpers, or more generally, any object able to be coated, for example an aircraft cabin part or a household appliance body, these examples not being limiting.

The installation I comprises a conveyor 2 provided to move the objects O along a conveying axis X2 perpendicular to the plane of FIG. 1 and parallel to the planes of FIGS. 4 and 5.

The installation I also comprises an applicator 10 mounted at the end of the arm 22 of the multiaxial robot 20 positioned near the conveyor 2.

Figure 2:
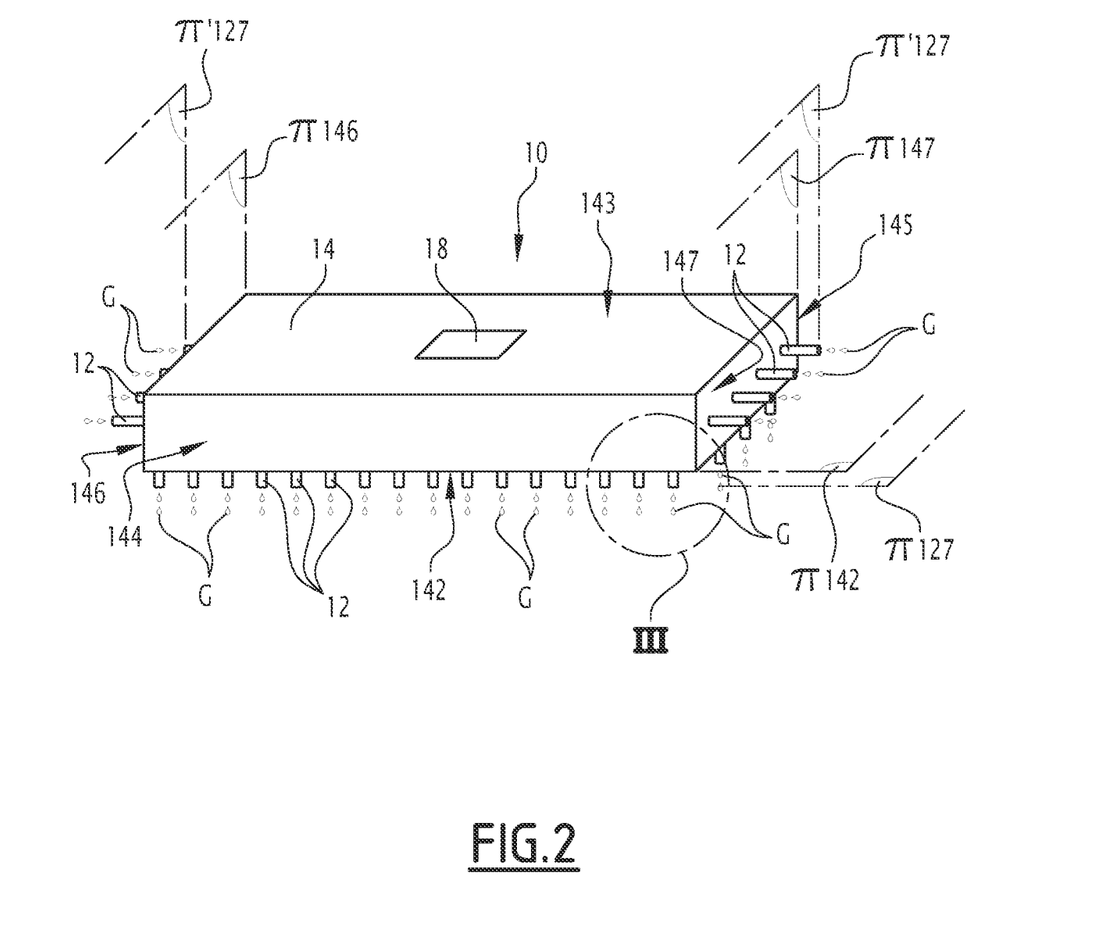
FIG. 2 is a perspective view of the applicator of the installation of FIG. 1.

The applicator 10 comprises several nozzles 12 that are identical to one another and that each belong to a printing head 13.

The applicator 10 comprises a body 14 that supports the nozzles 12 and that constitutes a rigid structural element making it possible to position the nozzles 12 in space. Preferably, the body 14 is monobloc. In the example, the body 14 is parallelepiped 14 and defines a front face 142, a rear face 143 parallel to the front face 142, two longitudinal faces 144 and 145 that are parallel to one another and two transverse faces 146 and 147 that are parallel to one another. The front and rear faces 142 and 143 are perpendicular to the longitudinal faces 144 and 145, on the one hand, and to the transverse faces 146 and 147 on the other hand. The longitudinal faces 144 and 145 are also perpendicular to the transverse faces 146 and 147. The faces 144 to 147 are adjacent to the face 142. The front face 142 of the body 14 faces toward an object to be coated when the applicator 10 is operating, in order to produce the main part of a pattern, by applying a coating product on an object O.

The nozzles 12 are mounted rigidly on the body 14. More specifically, four rows of sixteen nozzles 12 are positioned on the front face 142 of the body 14, these nozzles protruding from this front face, which is planar.

Figure 3:
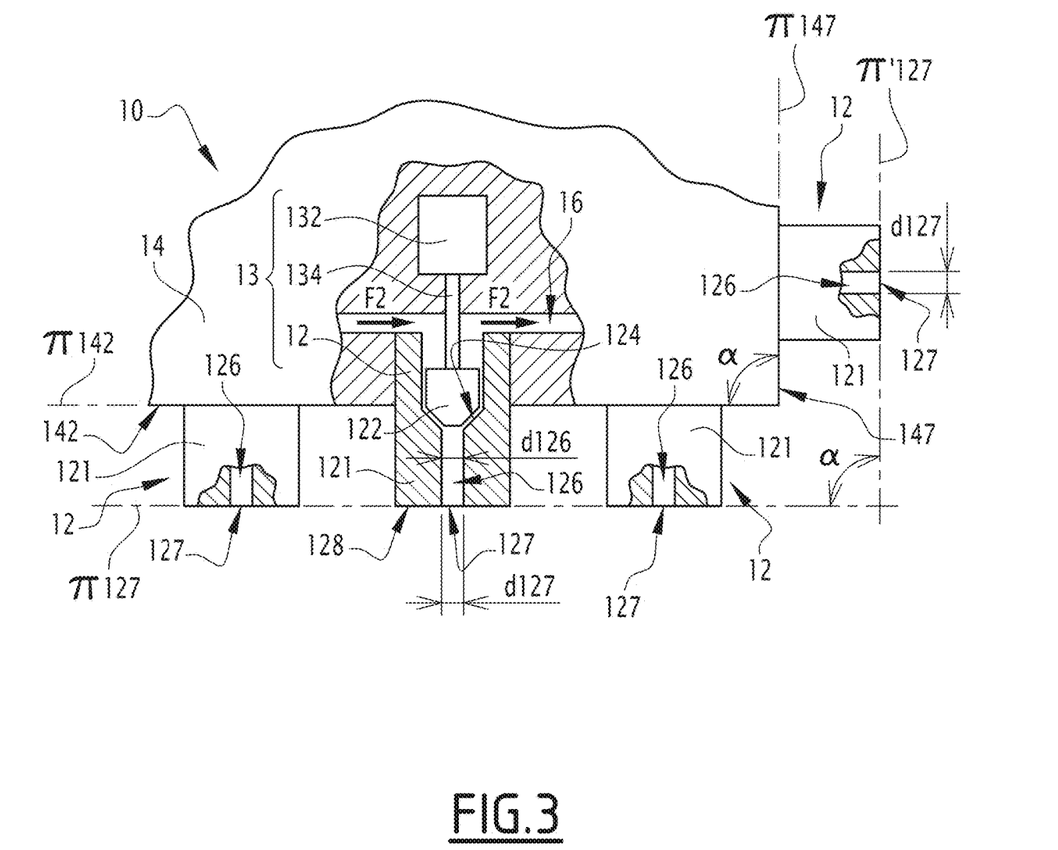
FIG. 3 is an elevation view with partial cutaway of detail III of FIG. 2.

As emerges from FIG. 3, each nozzle 12 belongs to a printing head 13 that further comprises a control member 132, for example of the piezoelectric component type, and a rod 134. Each nozzle 12 comprises a needle 122, controlled by the control member 132 of the printing head 13 to which the nozzle belongs. The needle 122 is coupled to the component 132 by the rod 134.

The paint to be applied flows in a channel 16 arranged in the body 14 and circulates, from one nozzle 12 to the other, in the direction of the arrows F2. The channel 16 constitutes a common supply means of various nozzles 12 located on the face 142 of the applicator 10.

Reference 121 denotes the part of a nozzle 12 that protrudes from a face of the body 14. Inside the part 121 of a nozzle, a seat 124 is arranged against which the needle 122 of the nozzle bears selectively, being controlled by the component 132.

An outlet channel 126 is arranged in each nozzle 12, downstream from its needle 122 and its seat 124. This outlet channel emerges toward the outside, opposite the needle 122, via a discharge orifice 127 arranged in a front face 128 of the nozzle 12, more specifically in the front face 128 of its part 121.

Thus, each nozzle 12 constitutes a printing nozzle intended to selectively discharge paint through its discharge orifice 127.

Reference d126 denotes the diameter of the outlet channel 126 of a nozzle 126 and d127 denotes the diameter of the discharge orifice 127 of this nozzle. For example, the diameters d126 and d127 are equal. The diameter d127 is between 50 micrometers (μm) and 500 μm, preferably between 100 μm and 200 μm, still more preferably in the order of 150 μm.

Thus, each nozzle 12 is capable of discharging a series of droplets G from its discharge orifice 127. In FIG. 2, these droplets G are shown as all leaving the printing nozzles 12 at the same time, which does not correspond to the method described below, but makes it possible to identify the flow paths of these nozzles.

Reference π142 denotes the main plane of the front face 142, which is planar. Reference π127 denotes the plane in which the discharge orifices 127 of the nozzles 12 are positioned on the front face 142. The planes π142 and π127 are parallel and the orifices 127 are in turn distributed on the front face 142, in the vicinity thereof.

The transverse surface 147 is equipped with four nozzles 12 identical to those shown on the front face 142, which constitute a row of printing nozzles and which also protrude relative to this surface 147, which is planar and the main plane of which is denoted π147.

The discharge orifices 127 of the nozzles 12 mounted on the surface 147 extend in a plane π127 parallel to the plane π147 and can be considered also to be distributed on the surface 147, in the vicinity thereof.

Likewise, four printing nozzles 12 are mounted on the transverse surface 146, which is planar and the main plane of which is denoted π146. The discharge orifices of these nozzles 12 extend in a plane π"127 parallel to the plane π146. These orifices can be considered to be evenly distributed on the surface 146, near the latter.

The planes π142 and π147, on the one hand, π142 and π146 on the other hand, are not parallel to one another. Thus, the discharge orifices 127 of the nozzles respectively provided on the faces 142, 146 and 147 extend in at least two non-parallel dimensions.

In this sense, the applicator 10 can be qualified as multidimensional multi-nozzle head. It constitutes a coating product head that makes it possible to apply such a product with a high degree of precision, as emerges from the following explanations.

Reference α denotes an angle defined, inside the body 14, between the planes π142 and π147.

In the example of FIGS. 1 to 5, this angle α is equal to 90°.

In practice, this angle α can be between 30° and 150°, preferably between 60 and 90°. Preferred values of this angle are 60°, 90° and 120°.

Since the planes π127 and π'127 are respectively parallel to the planes π142 and π147, the angle α is also the angle between the planes π127 and π'127, measured on the side of these planes facing the body 14.

Inasmuch as the angle α is not equal to 180°, the nozzles positioned 12 on the faces 142 and 147, which respectively discharge paint perpendicular to the planes π127 and π'127, make it possible to discharge paint in two non-parallel directions.

The situation is the same for the printing nozzles 12 respectively located on the faces 142 and 146.

When there is a need to create a strip B by forming patterns on the roof of a motor vehicle body O, the applicator 10 is brought by the multiaxial robot 20 above the zone of the roof to be coated, then the applicator 10 is moved parallel to the longitudinal axis of the body, which is practically parallel to the axis X2, as shown by the arrows F4 and F4' in FIG. 4.

During these movements, the nozzles 12 positioned on the front face 142 of the body 14 are activated.

In other words, the needles 122 of these nozzles 12 are moved away from their seats 124 by the actuators 132 and the rods 134 of the corresponding printing heads 13. The outlet channels 126 of these nozzles are supplied with paint and the paint is discharged through their respective discharge orifice 127, which are in the plane π127, toward the roof of the body O, as shown by the droplets G that flow in the direction of the arrows F42 in FIG. 4. This printing technique makes it possible to form, on the roof of the vehicle, a strip B whose longitudinal edges, parallel to the movement direction of the applicator along the arrows F4 and F4', are clearly defined and rectilinear.

Thus, in a method for applying paint on an object O such as the body shown in FIGS. 1, 4 and 5, a first step consists of producing the strip B by moving the applicator 10 in the direction of the arrows F4 and F4' in FIG. 4, while supplying the nozzles 12, whose discharge orifices 127 are located in the plane π127.

Next, to produce the transverse borders of the strip B and in a second step, the robot 20 brings the transverse face 147 of the applicator 10 across from the rear edge of the roof of the body and moves this applicator 10 perpendicular to the axis X2, in the direction of the arrows F5 and F5' in FIG. 5, while activating the nozzles 12 mounted on this transverse face 147, which results in discharging droplets G of paint toward the edge of the roof from discharge orifices 127 of these nozzles located in the plane π'127, in the direction of the arrow F52 in FIG. 5. This makes it possible to form, at the rear end of the strip B, a sharp transverse border that is not jagged.

The passage of the applicator 10 from the position of FIG. 4 to that of FIG. 5 is quick and easy to carry out by the multiaxial robot 20, in particular because the faces 142 and 147 are adjacent.

An operation of the same type is next performed, in the same second step of the method, at the front edge of the strip B, by activating the four nozzles 12 positioned on the transverse face 146 of the body 14, which discharge paint through their discharge orifices 127 located in the plane π"127.

In a variant, the implementation order of the sub-steps of the second step, consisting of creating the front and rear transverse borders of the strip B, can be reversed.

According to another variant, the production of a transverse border can be done only in front of or only behind the strip B.

During the method for applying paint shown in FIGS. 4 and 5, the application distance, that is to say, the distance measured between the discharge orifices 127 of the active printing nozzles 12 and the surface of the roof of the object O being coated, is advantageously between 5 and 50 mm. This makes it possible to increase the paint transfer rate and to reduce the separation of the overspray, that is to say, the diffuse cloud of paint, relative to the imprint of the main spray, that is to say, the cloud of paint directed primarily onto the body. This makes it possible to ensure that the uncontrolled drops G of paint are deposited as close as possible to the coverage area of the main spray, therefore of the drops under control, intended to form the strip B.

Figure 6:
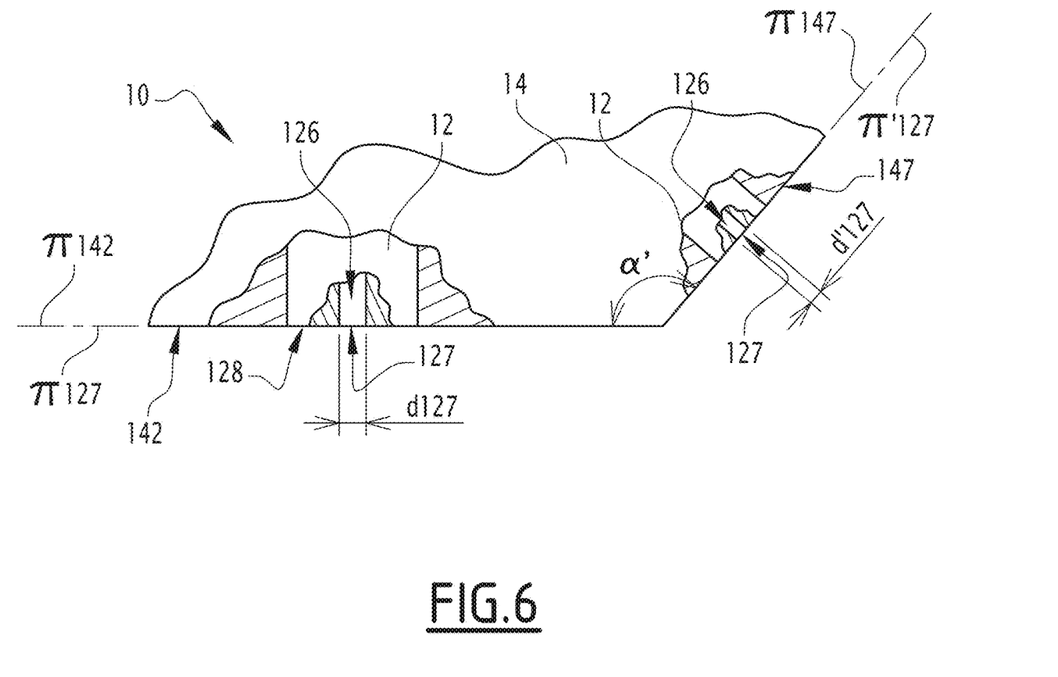
FIG. 6 is an elevation view, with partial cutaway, of part of an applicator according to a second embodiment of the invention.

In the second embodiment of the invention shown in FIG. 6, the elements similar to those of the first embodiment bear the same references. Hereinafter, we only describe what distinguishes this embodiment from the previous one.

In this embodiment, the nozzles 12 are completely integrated inside the body 14 of the applicator 10. In other words, the front surfaces 128 of the nozzles 12, in which the discharge orifices 127 are arranged, are related to the side faces of the body 14, in particular the front 142 and transverse 147 faces shown in FIG. 6. In other words, the planes π142 and π127 are combined, as well as the planes π147 and π'127.

Like before, the planes π142 and π147 are not parallel, like the planes π127, π'127. Thus, the nozzles 12 respectively positioned on the surfaces 142 and 147 make it possible to discharge paint in both nonparallel directions.

Here, the angle α defined as in the first embodiment is equal to 120°.

In this embodiment, the printing nozzles 12 positioned on the face 142 are identical to one another and the printing nozzles 12 positioned on the face 147 are identical to one another, but the diameter d127 of the discharge orifices 127 of the printing nozzles 12 positioned on the surface 142 has a first value, while the diameter d'127 of the orifices 127 of the nozzles 12 positioned on the surface 147 has a second value, lower than the first value. In other words, the discharge orifices 127 of the nozzles 12 positioned on the transverse face 147 are smaller than the discharge orifices 127 of the nozzles 12 positioned on the front face 142. This can be held up against the fact that, when the nozzles 12 that equip the face 142 are used, a relatively large surface area is produced, for which a relatively significant paint flow rate is necessary, as emerges from the explanations relative to the first step of the method mentioned above. On the contrary, when a transverse border of the strip B is produced in the context of the second step of the method, a greater precision is necessary, and the surface to be coated has a smaller area. Indeed, the smaller the diameter d127 or d'127 is, the smaller the droplets leaving the discharge orifice 127 are and the cleaner the sharpness of the produced edge is.

It will be understood that the printing nozzles 12 positioned on the various faces of the body 14 are used at different moments during the implementation of a method for applying coating product. This is why it is provided that the printing nozzles whose discharge orifices are distributed on two separate faces of the body 14 are activated independently of one another, when the applicator 10 is in use. For example, it is possible to provide that one channel or several shared paint circulation channels 16 are provided to supply the nozzles 12 mounted on the surface 142, while another comparable channel is provided to supply the nozzles 12 provided on the face 146 and that still another comparable channel is provided to supply the nozzles 12 provided on the face 147. The supply of paint to these different channels is regulated by valves, preferably integrated into the body 14, controlled independently of one another.

Furthermore, the various actuators 132 of the printing head 13 including the various nozzles 12 can be controlled independently of one another.

On a motor vehicle body painting line, depending on the body models and the patterns to be painted, there may be call to coat surfaces with very different areas with an applicator of the type of the applicator 10. For example, a decorative hood strip may be made with a width of 100 mm over a length of 1 m, which corresponds to an area of 0.1 m², while coating an entire roof amounts to covering a surface of about 2 m×2 m, or 4 m². The applicator 10 could therefore be selected as a function of the anticipated use.

To that end, it is possible to provide that the applicator 10 is equipped with an interface 18 provided on its rear face 143 and allowing it to be assembled/disassembled quickly to the end of the arm 22 of the robot 20. This interface makes it possible to produce a fluid and electrical connection of the applicator 10 with the robot 20. For example, the interface 18 can work with a magnetic clipping system or according to any other appropriate method.

In this case, different applicators 10 are stored in a warehouse, in the activity area of the robot 20, for example at the foot thereof. Each applicator is provided to apply paint with a flow rate belonging to a range of flow rates, therefore provided to coat a surface with an area comprised in a range of areas, during the time allocated to implement the inventive method. This allows the robot 20 to load the applicator 10 most suitable for the pattern to be produced on the vehicle body entering its work area.

In the above description, the applicator 10 is described in the case where the printing nozzles 12 are provided on three faces of the body 14, namely the faces 142, 146 and 147. In a variant, the nozzles 12 can be provided on only two of these faces, or on the contrary, on four, five or six of these faces, having specified here that preferably, the rear face 143 is not equipped with nozzles 12.

The invention is described above in the case of the application of paint on a motor vehicle body. It is particularly adapted to the application of paint of the base coat type, that is to say, a layer of color with or without effects, as well as the application of mono- or dual-component varnish. The application of a primer can also be considered.

In a variant, the applicator 10 can be used to apply an ink or any other coating product.

When the applied product has two or more components, and according to a variant of the invention that is not shown, a static mixer is integrated into the installation I, more specifically inside the body 14, on the path of the channel 16, just upstream from the nozzles 12.

According to an optional aspect of the invention, an additional guide area can be brought to the level of the front face 128 of each nozzle 12 in order to contain the drops G leaving the discharge orifices 127. This additional guide area can be discharged in the form of an air knife, that is to say, an air curtain acting as a border that cannot cross the droplets G, an air ring or several air jets configured with a vortex form, converging or diverging toward the axis of the outlet channel 126 of each nozzle. This additional guide area can be brought into the vicinity of nozzles 12 in an individualized manner or for a group of nozzles, for example, a row of nozzles, a column of nozzles or a matrix of nozzles, or even in a grouped manner for all of the nozzles positioned on a face of the body 14 of the applicator 10.

To improve the performance of the deposition of the application obtained with the applicator 10, an electrostatic charge system for the applied coating product can be provided, this system having an internal charge and/or external charge, which makes it possible to accelerate the drops G leaving the discharge orifices 127 and to deposit them on the surface to be coated, which is coupled to the ground. Such an electrostatic system can be provided individually for each nozzle 12, for a group of nozzles, for example by row, by column or for a matrix of nozzles, or in the form of a single electrostatic system provided for all of the nozzles of the applicator 10.

The mentioned numbers of nozzles 12 indicated above and shown in the figures are for information only. In a variant, they can be different. Preferably, several printing nozzles 12 are provided on a first face of the body 14, for example the face 142, to be used during the first step of the method. These nozzles are preferably positioned in rows and columns. One or several nozzles are provided on another face, for example the face 146 or 147, for the second step.

The number of nozzles provided on the first face of the body 14 is different, in practice higher, than the number of nozzles provided on the other face.

In a variant, the body 14 of the applicator 10 can be supported by a device other than a multiaxial robot, as long as this device makes it possible to carry out both steps of the inventive method. For example, a crossed table can be used for an application on parallelepiped objects.

In a variant, the installation I comprises several applicators 10.

In a variant, the body 14 can have a shape other than parallelepiped.

According to another variant, the body 14 can be made up of several parts assembled rigidly, that is to say, with no possibility of relative movement with respect to one another.

If the faces of the body 14 on which the printing nozzles 12 are assembled are not planar, the main planes π142, π146 and π147 are defined as mean planes of the spaces, as are the planes π127, π'127 and π"127. This is in particular the case if the applicator is used to apply a paint or varnish on frames or door contours, which may have a section having several sides coupled by rays that may be painted at the same time.

The invention is described above during its implementation for the creation of a strip. It is, however, applicable to create other patterns on any object to be coated.

The embodiments and alternatives considered above may be combined to generate new embodiments of the invention.

The invention claimed is:

1. A coating product applicator comprising printing nozzles each including an outlet channel emerging in a downstream direction by a coating product discharge orifice, wherein the printing nozzles are distributed on at least two faces of a rigid body of the applicator, wherein the discharge orifices of these nozzles extend along at least two nonparallel planes, and wherein the printing nozzles distributed on a first face of the rigid body of the applicator are configured to activate independently of the printing nozzles distributed on a second face of the rigid body of the applicator when the coating product applicator is operating, and wherein the rigid body is parallelepiped having six faces as follows:
   a front face that is planar;
   a rear face that is planar and parallel to the front face;
   two longitudinal faces that are planar and parallel to one another; and
   two transverse faces that are planar and parallel to one another;
wherein the said first face with distributed printing nozzles corresponds to the front face, and said second face with distributed printing nozzles corresponds to one of the two longitudinal faces or the two transverse faces.

2. The applicator according to claim 1, wherein an angle is formed between the two nonparallel planes form, on the side of the rigid body of the applicator, wherein the angle is between 30° and 150°.

3. The applicator according to claim 2, wherein the angle is between 60 and 120°.

4. The applicator according to claim 3, wherein the angle is equal to 60°, 90° or 120°.

5. The applicator according to claim 1, wherein the applicator comprises several first printing nozzles, the discharge orifices of which are distributed on a first face of the rigid body, and at least one second printing nozzle, the outlet orifice of which is on a second face of the rigid body, and wherein the number of the first nozzles is different from the number of the second nozzle(s).

6. The applicator according to claim 1, characterized in that the printing nozzles distributed on the at least two faces of the rigid body have discharge orifices with identical dimensions.

7. The applicator according to claim 1, wherein the printing nozzles distributed on at least one of the faces of the rigid body have discharge orifices with dimensions that are different from the dimensions of the discharge orifices of the printing nozzles distributed on at least one other face of the rigid body.

8. The applicator according to claim 1, wherein the at least two faces of the rigid body on which the printing nozzles are distributed are adjacent.

9. The applicator according to claim 1, wherein the applicator comprises a mixer integrated into the rigid body of the applicator, upstream from the printing nozzles.

10. The applicator according to claim 1, wherein the rigid body is monobloc.

11. The applicator according to claim 1, wherein the rigid body is made up of several parts assembled rigidly preventing relative movement between said rigidly assembled parts.

12. The applicator of claim 1, wherein the front and rear faces are perpendicular to the longitudinal faces and to the transverse faces, and the longitudinal faces are perpendicular to the transverse faces.

13. An installation for applying a coating product on objects to be coated, which comprises at least one applicator according to claim 1.

14. The installation of claim 13, wherein the applicator is mounted on an arm of a multiaxial robot provided to move the applicator relative to the objects to be coated.

15. A method for applying a coating product on an object to be coated, the method comprising:
   a) providing the applicator according to claim 1 and producing a pattern with the coating product, by moving the applicator along a first movement axis, while first printing nozzles distributed on a first face of the rigid body of the coating product applicator are active; and
   b) making at least one transverse border of the pattern, by moving the coating product applicator along a second axis perpendicular to the first axis, while second printing nozzles distributed on a second face of the rigid body are active.

16. The method according to claim 15, wherein, during steps a) and/or b), an application distance between the discharge orifices of the active printing nozzles and the surface of the object in the process of being coated is between 5 and 50 mm.

17. A coating product applicator comprising printing nozzles each including an outlet channel emerging in a downstream direction by a coating product discharge orifice, wherein the printing nozzles are distributed on at least two faces of a rigid body of the applicator, wherein the discharge orifices of these nozzles extend along at least two nonparallel planes, and wherein the printing nozzles distributed on a first face of the rigid body of the applicator are configured to activate independently of the printing nozzles distributed on a second face of the rigid body of the applicator when the coating product applicator is operating, wherein the rigid body has six faces as follows:
   a front face that is planar;
   a rear face that is planar and parallel to the front face and having a larger surface area than the front face;
   two longitudinal faces that are planar; and
   two transverse faces that are planar;

wherein the said first face with distributed printing nozzles corresponds to the front face, and said second face with distributed printing nozzles corresponds to one of the two longitudinal faces or the two transverse faces.

18. The applicator according to claim 17, wherein an angle is formed between the two nonparallel planes form, on the side of the rigid body of the applicator, wherein the angle is between 30° and 150°.

19. The applicator according to claim 18, wherein the angle is between 60 and 120°.

20. The applicator according to claim 19, wherein the angle is equal to 60°, 90° or 120°.

21. The applicator according to claim 17, wherein the applicator comprises several first printing nozzles, the discharge orifices of which are distributed on a first face of the rigid body, and at least one second printing nozzle, the outlet orifice of which is on a second face of the rigid body, and wherein the number of the first nozzles is different from the number of the second nozzle(s).

22. The applicator according to claim 17, characterized in that the printing nozzles distributed on the at least two faces of the rigid body have discharge orifices with identical dimensions.

23. The applicator according to claim 17, wherein the printing nozzles distributed on at least one of the faces of the rigid body have discharge orifices with dimensions that are different from the dimensions of the discharge orifices of the printing nozzles distributed on at least one other face of the rigid body.

24. The applicator according to claim 17, wherein the at least two faces of the rigid body on which the printing nozzles are distributed are adjacent.

25. The applicator according to claim 17, wherein the applicator comprises a mixer integrated into the rigid body of the applicator, upstream from the printing nozzles.

26. The applicator according to claim 17, wherein the rigid body is monobloc.

27. The applicator according to claim 17, wherein the rigid body is made up of several parts assembled rigidly preventing relative movement between said rigidly assembled parts.

28. The applicator of claim 17, wherein the front and rear faces are perpendicular to the longitudinal faces and to the transverse faces, and the longitudinal faces are perpendicular to the transverse faces.

29. An installation for applying a coating product on objects to be coated, which comprises at least one applicator according to claim 17.

30. The installation of claim 29, wherein the applicator is mounted on an arm of a multiaxial robot provided to move the applicator relative to the objects to be coated.

31. A method for applying a coating product on an object to be coated, the method comprising:
 a) providing the applicator according to claim 19 and producing a pattern with the coating product, by moving the applicator along a first movement axis, while first printing nozzles distributed on a first face of the rigid body of the coating product applicator are active; and
 b) making at least one transverse border of the pattern, by moving the coating product applicator along a second axis perpendicular to the first axis, while second printing nozzles distributed on a second face of the rigid body are active.

32. The method according to claim 31, wherein, during steps a) and/or b), an application distance between the discharge orifices of the active printing nozzles and the surface of the object in the process of being coated is between 5 and 50 mm.

* * * * *